Aug. 18, 1942.    H. W. SEDAM    2,293,084
APPARATUS FOR TESTING FLEXIBLE MATERIALS
Filed Sept. 10, 1941    2 Sheets-Sheet 1
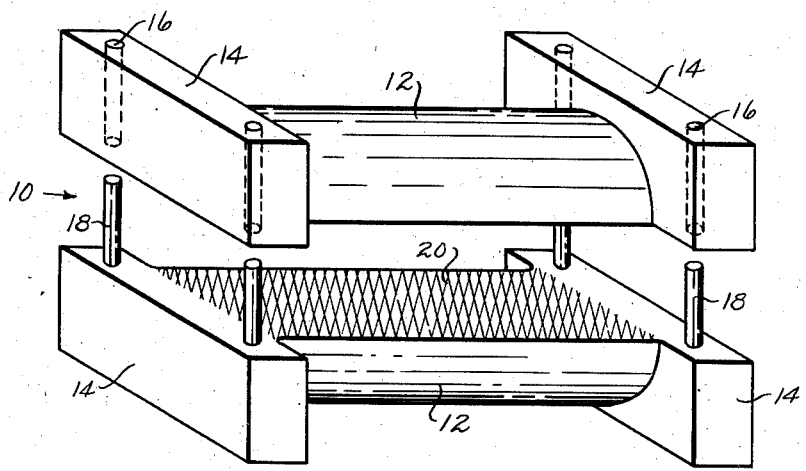
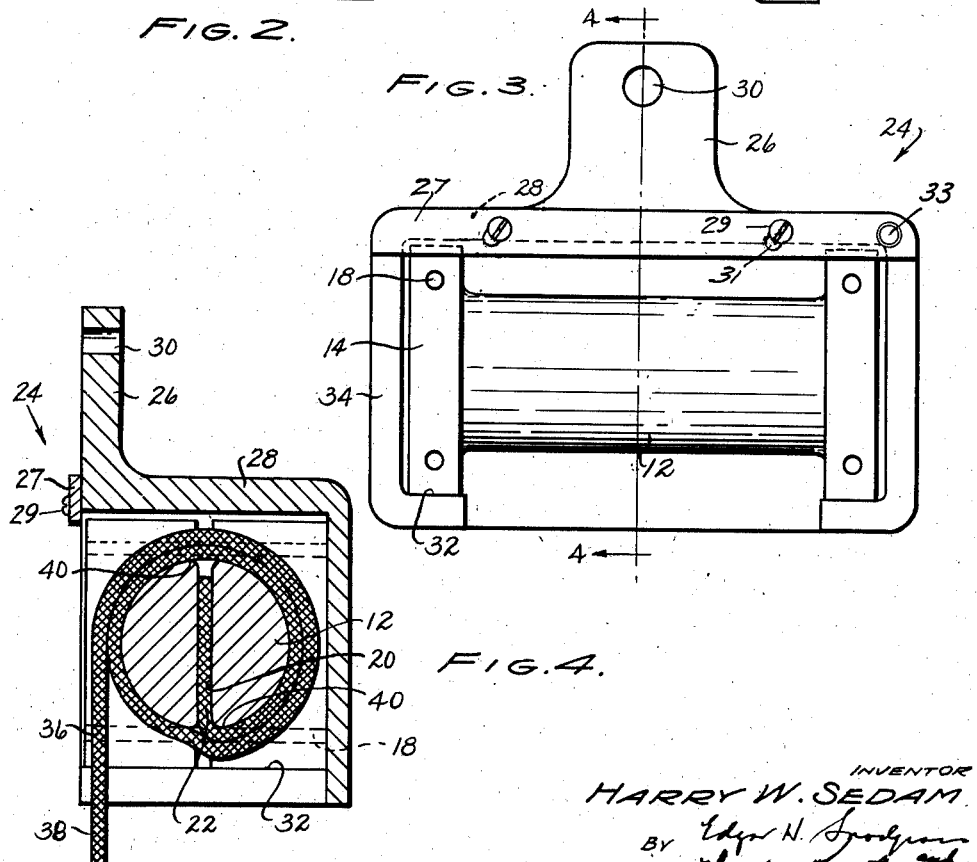
INVENTOR
HARRY W. SEDAM Aug. 18, 1942.  H. W. SEDAM  2,293,084
APPARATUS FOR TESTING FLEXIBLE MATERIALS
Filed Sept. 10, 1941  2 Sheets-Sheet 2

INVENTOR
HARRY W. SEDAM

Patented Aug. 18, 1942

2,293,084

UNITED STATES PATENT OFFICE 2,293,084

APPARATUS FOR TESTING FLEXIBLE MATERIALS

Harry W. Sedam, Dayton, Ohio

Application September 10, 1941, Serial No. 410,319

6 Claims. (Cl. 73—51)

(Granted under the act of March 3, 1883, as amended April 30, 1928; 370 O. G. 757)

The invention described herein may be manufactured and used by or for Government for governmental purposes, without the payment to me of any royalty thereon.

This invention relates to apparatus for making tensile tests on flexible materials such as tape, webbing, cord, etc., and particularly to means for gripping such materials at the ends when making such tests.

In making tensile tests on the more solid materials, such as metals, etc., no great difficulty is experienced in making connection of the test piece to the test machine, it being the practice to fashion a test sample to a unit cross sectional area but leave the ends to be gripped of greatly increased dimensions, whereby suitable gripping notches or grooves may be made in the enlarged ends without bringing the cross sectional area at the grooved places below that of the unit area to be tested.

With flexible materials of the character above indicated, however, there is greater difficulty in getting a proper hold on the material to be tested without so weakening it at the points to which the grips are attached that rupture will occur there, and in such case will fail to give a proper indication of the tensile strength of an undamaged section.

It is therefore an object of this invention to provide, in a device of this kind, means to grip the material which is to be tested in such a manner that no injury will be done the gripped ends, whereby more accurate tests will result.

Another object is to so construct and arrange the mechanics of the device that a minimum of time is consumed in attaching and removing the material tested to and from the apparatus.

Another object is to provide apparatus for this purpose which may readily be attached to a standard testing machine.

Other objects and advantages will be perceived from a consideration of the specification and drawings wherein, Figs. 1 and 2 are perspective views of the front and rear half respectively of the gripping tool.

Fig. 3 is a front elevational view of the gripping tool holder with a gripping tool in place.

Fig. 4 is a transverse section taken at 4—4 of Fig. 3, showing a strip of material in place preparatory to taking a tensile test thereof.

Like numerals refer to like parts throughout the several views.

Figure 5:
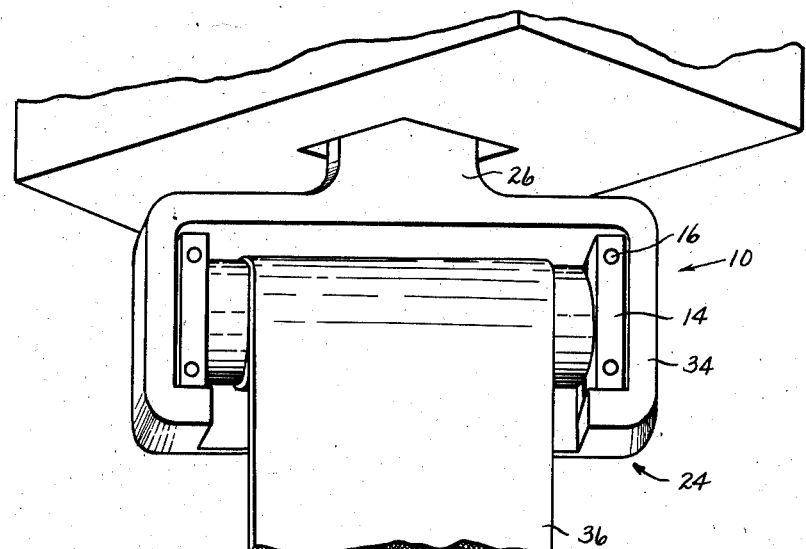
Fig. 5 shows a testing machine equipped with the improved tool and holder of this invention with a section of webbing in place ready for a tensile test.

Referring now to the drawings, the gripping tool 10 is in two main parts, which, when in use, compose a spool like structure in which the body of the spool is round and the integral spool ends are square.

Each main part of the tool 10 is made up of a bar 12 of segmental cross section, the arc of the segment being nearly a semi-circle, and two integral rectangular end parts 14.

Dowel holes 16 are provided in the rectangular ends, and dowel pins 18 are preferably press fitted into one member, and slidably fitted in the other. The flat sides of the bars 12 are preferably knurled or otherwise roughened as at 20.

The dimensions of the bars 12 and ends 14 are such that when the tool is assembled with a strip of the webbing 22 which is to be tested clamped between the two bars 12 (see Fig. 4), the ends of the spool will be substantially square, and the intermediate portion substantially round.

The gripping tool holder 24, shown in Figs. 3 and 4, is in the form of a box with a lug 26 extending upwardly from the top 28 of the box for attachment to the testing machine, a hole 30 being provided to facilitate attachment.

The front of the box, that is, the side facing forward in Fig. 3 and facing left in Fig. 4, is open, and the bottom is also cut away for the most part, leaving only the ledges 32. The square ends of the gripping tool 10 should preferably fit slidably between the top 28 and ledges 32 and may fit somewhat more freely between the ends 34. A strip 27 is slidably held to the top 28 by screws 29 which extend through diagonal slots 31 into the top 28. A knob 33 is provided for raising the strip when the work to be tested is being inserted.

On the device shown, a section of webbing 36 (see Fig. 4) may be tested which is almost as wide as the space between the heads 14, the end 22 of the webbing being inserted between bars 12 but not far enough to extend beyond the top edges of the bars, then wrapped around the bars and extended downward as at 38. The corners 40 of the bars 12 should be well rounded, and the lug 26 should be so located on the top 28 that the vertical center line of the lug passes also through the vertical center line of the webbing.

In Fig. 5 a pair of holders 24 are attached to a testing machine and a pair of gripping tools 10 are properly located in the holders for making a test. Webbing 36 is attached to the upper and lower tools 10 in the manner shown in Fig. 4. The means for applying and recording the stress required to rupture the webbing is part of a standard testing machine and is therefore not shown or described.

Figure 6:
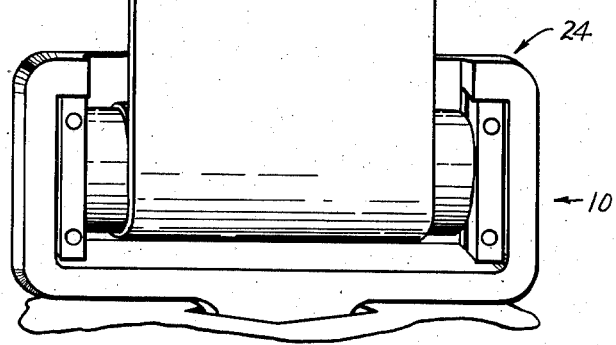
Figs. 6 and 7 are perspective views of the front and rear half respectively of a modified form of gripping tool adapted for making tensile tests on cord, rope, or other round material.
Figure 7:
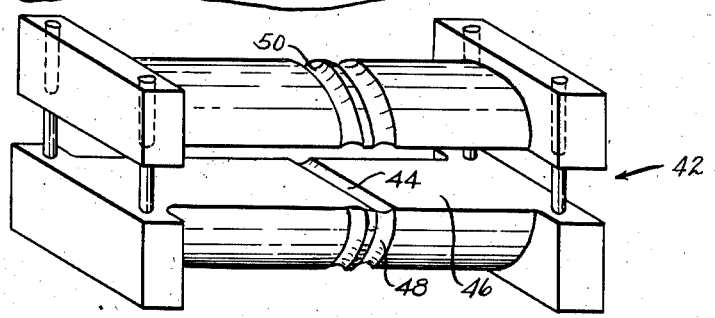

A modification 42 of the tool 10 may be provided for testing rope or similar round material (see Figs. 6 and 7). In this tool, shallow grooves 44, the depth of which is less than half the diameter of the rope or cord to be tested, are cut across the flat faces 46 of the bars, then helically around the assembly of the two bars as at 48 and 50.

The end of the rope is inserted into the grooves 44 between the bars, then wrapped around the assembled tool in the same manner as is shown relative to the webbing of Fig. 4 except that the webbing in Fig. 4 has several turns wound one upon the other while in the tool 42 the several turns are wound helically side by side.

In the embodiments shown, the rectangular ends 14 of the tool 10 co-operate with appropriately shaped recesses in the tool holder 24 whereby the cylindrical portion of the tool around which the test sample is wound cannot rotate when the stress is applied to the sample.

It will be understood, however, that any convenient co-operating means which will prevent the cylindrical tool from rotating in the holder will be considered within the spirit of the invention.

Having described the invention, I claim:

1. The combination, in a tensile testing apparatus for testing flexible material, of a testing tool in the form of a spool comprising a round portion at least as long as the width of said material, rectangular end heads projecting from the opposite ends of the round portion, a testing tool holder comprising a boxlike structure, a lug on the top of said structure for attachment to a testing machine, the front side being open and the top and bottom being parallel and spaced to slidably receive the said rectangular heads and thereby keep said spool from rotating about its axis, said spool being divided by an axial cut into two half spools, and means to hold said half spools in register.

2. The combination, in a tensile testing apparatus for testing flexible webbing, of a testing tool in the form of a spool divided along an axial plane into two half spools, means on the half spools to hold them in register, said half spools, when the end of the webbing is placed between them, forming a cylindrical middle portion, rectangular end heads on said cylindrical portion, said cylindrical portion being at least as long as the webbing is wide, a testing tool holder in the form of a box having one side open the interior of said box being rectangular and adapted to slidably receive the said rectangular ends, and a lug on the top of the box for attachment to a testing machine, the vertical center line through said lug passing forward of the side of the cylinder a distance equal to one and one-half times the thickness of said webbing.

3. In combination with a tensile testing machine, apparatus for testing flexible webbing comprising a testing tool in the form of a spool divided along an axial plane into two part, means on said parts to hold them in register, said spool parts being adapted to have the end of the webbing inserted between them and wound thereabout several turns, and when so inserted the spool comprises a cylindrical body at least as long as the webbing is wide, substantially rectangular end heads on said body, a tool holder in the form of a box with one side open the interior of said box being of a size and shape to slidably receive the rectangular end heads, and a lug on the top of said box formed for attachment to said testing machine and positioned to bring the vertical center line of the machine through the outer turn of said webbing.

4. Apparatus for making tensile tests on flexible material comprising a tool in the form of a spool having a middle portion of circular cross section, non-circular end heads on said middle portion, said spool being divided along an axial plane into half spools, contiguous flat faces of the half spools being roughened, whereby said webbing may be held by having its end inserted between the half spools and wrapped several turns around the round portion, in combination with a tool holder, means on said holder for attachment to a testing machine, and means on said holder shaped interiorly to slidably fit over said non-circular end heads, thereby holding the spool from rotating.

5. In an apparatus for testing strip material, a tool comprising a rounded bar divided along an axial plane into half bars, whereby said strip may be held by having its end inserted between the half bars and wrapped several turns around the rounded bar, in combination with a tool holder, means associated with said holder for attachment to a testing machine, holding means on the ends of the bar beyond the edges of said strip, and coacting holding means in the holder to hold said bar from rotating.

6. In an apparatus for making tensile tests on flexible material such as rope or cord, a tool comprising a cylinder divided along an axial plane into half cylinders with matching grooves, somewhat less in form and depth than half the cord to be tested, extending transversely across the contiguous surfaces of the half cylinders then helically around the cylinder for several turns, in combination with a tool holder having attaching means for connection to a testing machine, means for receiving and holding the cylinder, and co-operating means on the holder and the cylinder ends whereby the cylinder is held from rotating.

HARRY W. SEDAM.